Figure 1:
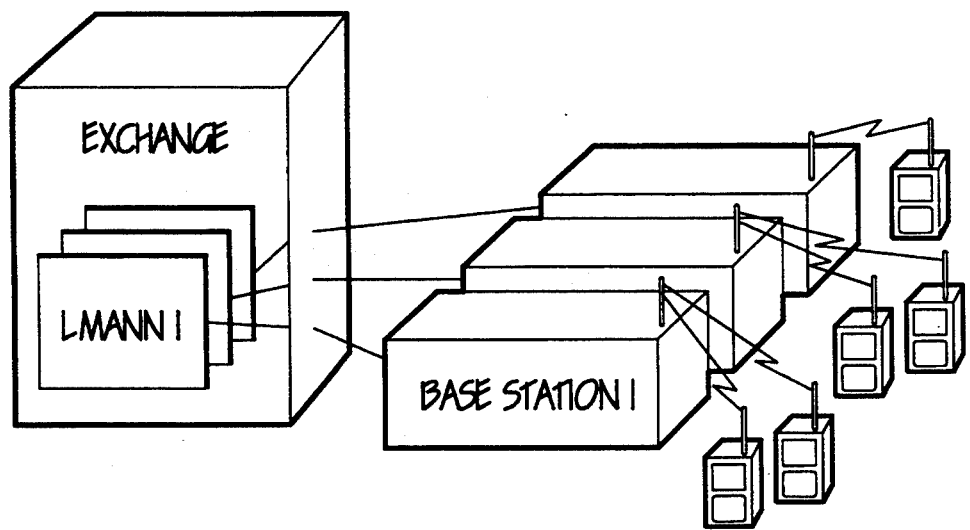

United States Patent [19]

Käallman

[11] Patent Number: 5,434,950
[45] Date of Patent: Jul. 18, 1995

[54] METHOD FOR MAKING HANDOVER DECISIONS IN A RADIO COMMUNICATIONS NETWORK

[75] Inventor: Robert Käallman, Bandhagen, Sweden

[73] Assignee: Televerket, Farsta, Sweden

[21] Appl. No.: 32,664

[22] Filed: Mar. 17, 1993

[30] Foreign Application Priority Data

Apr. 13, 1992 [SE] Sweden ............................ 9201164

[51] Int. Cl.6 ............................................ G06F 15/18
[52] U.S. Cl. ...................................... 395/22; 395/24; 395/23
[58] Field of Search ..................... 395/10, 24, 21, 26, 395/22, 23

[56] References Cited

U.S. PATENT DOCUMENTS

| | | | |
|---|---|---|---|
| 4,796,199 | 1/1989 | Hammerstrom et al. | 395/10 |
| 4,874,963 | 10/1989 | Alspector | 395/24 |
| 4,918,617 | 4/1990 | Hammerstrom et al. | |
| 4,983,962 | 1/1991 | Hammerstrom et al. | |
| 5,014,235 | 5/1991 | Morton | 395/275 |

OTHER PUBLICATIONS

Application Of NN Computing To Tactical Communications Planning F. M. Atwater, IEEE.
Intelligen Network Concepts in Mobile Communications B. Jabbari, IEEE, Feb. 1992.
Neural Networks for Routing Communication Traffic H. E. Rauch et al. Apr. 30, 1988.

Primary Examiner—Allen R. MacDonald
Assistant Examiner—Richemond Dorvil
Attorney, Agent, or Firm—Oblon, Spivak, McClelland, Maier & Neustadt

[57] ABSTRACT

The invention relates to a method for making handover decisions in a radio communication network comprising a number of fixed base stations and a number of mobile units. The method utilizes an artificial neural network which is an image of the real network of a respective base station and which exhibit a behavior pattern learned through the acquisition of information from the network. Thereafter, simulation is carried out in the neural network through the generation of a list of eligible base stations to which handover can be effected, every one of the eligible stations being given points. Thereafter, a decision is made whether, or not, a handover will be effected by the network.

5 Claims, 2 Drawing Sheets

INPUT LAYER   INTERMEDIATE   OUTPUT LAYER
              LAYERS

METHOD FOR MAKING HANDOVER DECISIONS IN A RADIO COMMUNICATIONS NETWORK

BACKGROUND TO THE INVENTION

The invention relates to a method for making handover decisions in a radio communications network comprising radio base stations and mobile units.

In accordance with the method of the present invention, decisions will be made concerning whether, and when, the handover of a mobile unit from one base station to another base station unit will occur. It is important that such decisions are correct because a wrong decision can result in communication being interrupted. Furthermore, wrong decisions concerning handover could also have the result that other mobile units are deprived of the possibility to communicate.

Neural networks are generally described in U.S. Pat. Nos. 4,796,199, 4,918,617 and 4,983,962. These patents are concerned with the organisation of a proposed architectural structure and provide a good source of information in relation to neural networks. In the following text, this information concerning neural networks will be utilised in connection with mobile telephony.

In mobile radio systems, communication is established between a mobile unit and a fixed unit, i.e. a base station. In practice, a mobile unit makes contact with a base station which is the most suitable for the purpose of establishing effective communication. The selection of a base station can be preprogrammed in relation to the geographic position of the mobile unit with respect to the base stations. Another possibility is for measurement to be made at the terminal, or at the base station. The parameters which will be considered are, for example, signal strength, distance and so forth. When a mobile unit has to change base station, it will normally be done in accordance with one of the above-mentioned principles. In the case where a wrong decision is made in respect of such a change, i.e. handover from one base station to another base station, an inferior transmission channel will be obtained, or alternatively, the communication will be interrupted. Any lack of handover can result in other connections being broken due to interference. It is thus of great significance that decisions concerning handover are made with the correct assumptions.

It is an object of the present invention to provide a method for making handover decisions in a radio communication network at the correct time. To this end, an artificial neural network has been created. The artificial neural network represents a model of the real radio communication network.

SUMMARY OF THE INVENTION

The present invention provides a method for making handover decisions in radio communication network which comprises a number of fixed base stations and a number of mobile units, and in which communication between a mobile unit and a first radio base station is discontinued to enable the communication to be handed over to a second radio base station, the method including the steps of causing an artificial neural network which is an image of the real network of a respective base station, to exhibit a behaviour pattern learnt through the acquisition of information from the network, the information acquired by the artificial neural network being correlated to the position of the mobile unit relative to the fixed base stations in the radio communication network with which the mobile unit can communicate; providing a list of fixed base stations with which the mobile unit can communicate, the artificial neural network determining the degree of suitability for communication with a respective fixed base station; providing information for the radio communication network concerning the most suitable fixed base station for communicating with the mobile unit; and making a decision concerning the connection of the mobile unit to a selected fixed base station.

The term "handover" means that a mobile unit in a radio communication network changes from communication with one radio base station of the network to another radio base station of the network which is better placed from the point of view of communication.

According to one aspect of the present invention, the neural network is allocated a number of layers comprising an input layer, an output layer and a number of intermediate layers, the input layer being allocated a number of nodes representing selected measurement data units, and the output layer being allocated a number of nodes representing a fixed base station to which the mobile unit is presently communicating and the fixed stations to which handover is possible, the nodes in the intermediate layers being utilised for simulation.

According to another aspect of the present invention, each node of the neural network is a neuron, and weights input data from all neurons in the preceding layer, all weighted signals being added together and thereafter subjected to transformation.

According to a further aspect of the present invention, the neural network is allocated training data, which is normalised, which is selected to be as representative as possible of network behaviour, and which is allocated for the entire reception area to be served by the fixed base station and for the areas adjoining the reception area, a desired structure for the neural network being determined for each set of training data.

Thus, the method according to the present invention solves handover problems with the aid of neural networks, which are characterised by being able to learn certain behaviour through the acquisition of information.

The neural network is an image of the real radio communication network and every one of the radio base stations of the network obtains access to a neural network that reflects the network of the base station concerned. A mobile unit identifies its geographic position and communicates this information to the radio base station which thereafter utilises the neural network for deciding whether, or not, there should be a change of radio base station i.e. a handover.

The foregoing and other features according to the present invention will be better understood from the following description with reference to the accompanying drawings, in which:

FIG. 1 illustrates, in a pictorial view, a radio communication network including mobile radio units and a number of base stations connected to a central exchange.

Figure 2:
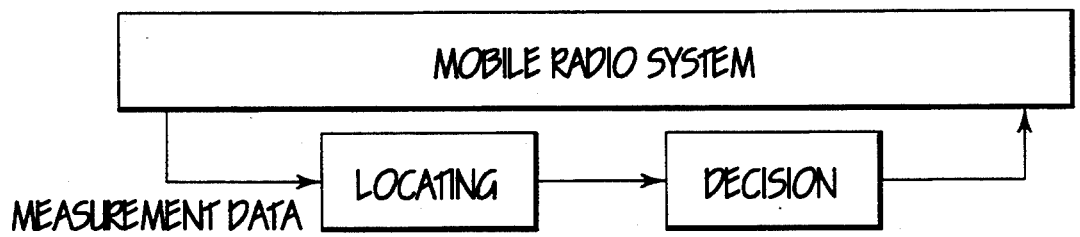
Figure 3:
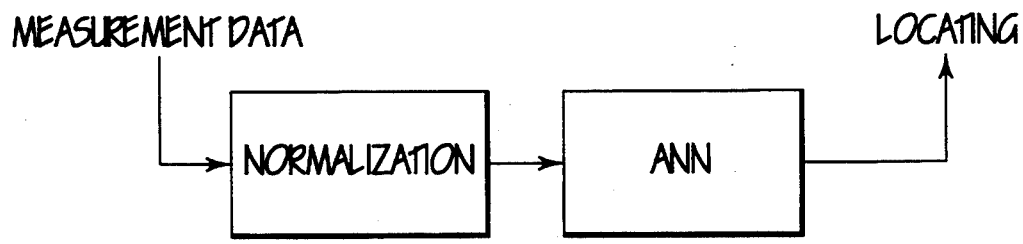
Figure 4:
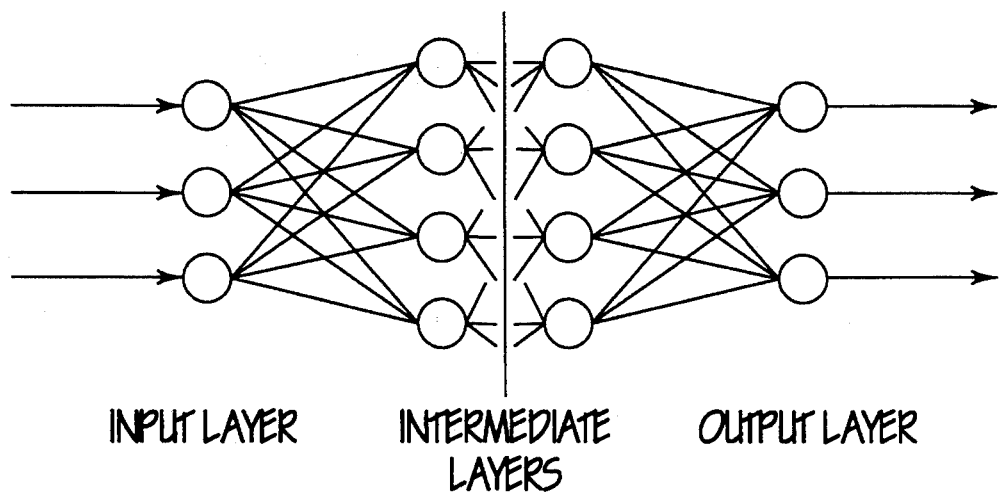
Figure 5:
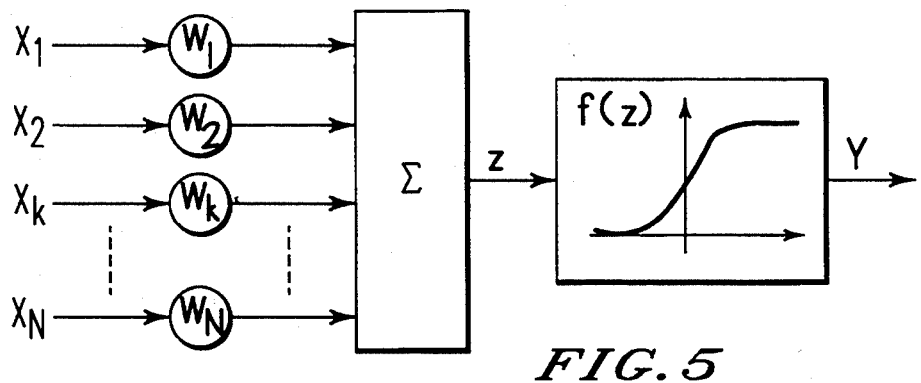

FIG. 2 shows, in the from of a block diagram, the manner in which measurement data in the mobile radio system is transferred to a locating block and thereafter to a decision block which forwards a decision regarding handover to the mobile radio system, FIG. 3 shows, in the form of a block diagram, the manner in which the measurement data is introduced FIG. 4 illustrates the structure of a neural network, FIG. 5 illustrates the manner in which input data from all nodes (neurons) in a layer of the neural network are weighted and added together and thereafter transformed.

Figure 6:
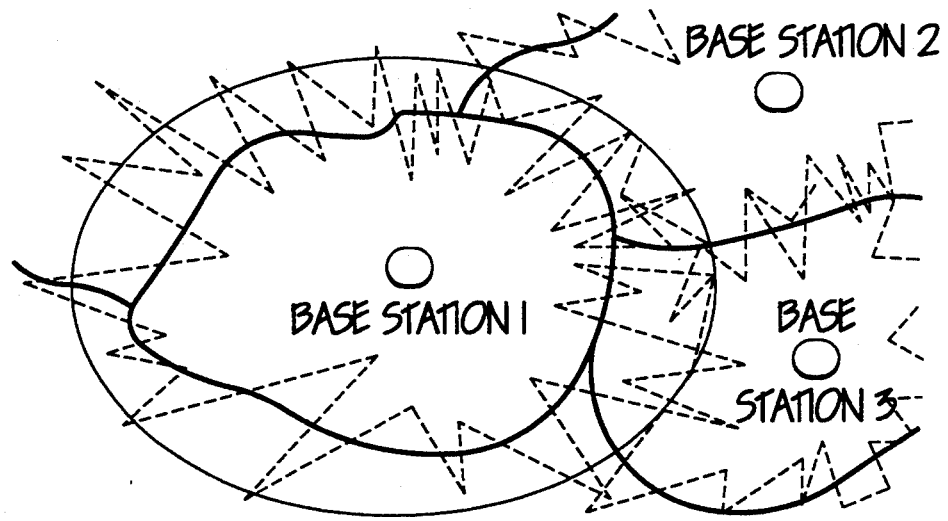

FIG. 6 illustrates the measurement area for a radio base station, and the adjacent base stations, of a radio communication network.

BRIEF DESCRIPTION OF THE INVENTION

The radio communication network illustrated in FIG. 1 of the drawings includes a number of base stations 1, each one of which is connected to a central exchange and adapted to communicated with a number of mobile units. The central exchange includes a number of LMNN functions, one for each base station. The LMNNs contain, inter alia, the artificial neural networks hereinbefore referred to.

As illustrated in FIG. 1 of the drawings, the mobile radio units communicate with a respective one of the radio base stations 1 over the airwaves. The radio base station 1 continuously receives information from a mobile radio unit about its position, received signal strength and so forth.

As shown in FIG. 2 of the drawings, this information, i.e. the measurement data from the mobile radio system, is fed into a locating block, associated with the radio base station 1, for locating the mobile radio unit from which the information is received. The information received by the locating block is then processed, consideration being given to the geographic position and the direction of movement of the mobile radio unit concerned. This processing results in the establishment of a list of radio base stations 1 which are eligible for communicating with the mobile radio unit. This list is a priority list, in that, it specifies an order of priority relating to the suitability of the eligible radio base stations for communicating with the mobile radio unit.

As shown in FIG. 2, the priority list is then transferred to a decision block which decides, and provides an output indicative of, whether, or not, the mobile radio unit should change radio base stations. The decision is then forwarded to the mobile radio system.

In order to obtain the best possible decision with such an arrangement, it is necessary, as shown in FIG. 3 of the drawings, to create an artificial neural network (ANN). With this arrangement, the measurement data is applied to a normalisation block and the normalised data at the output of this block is transferred to the artificial neural network. The output of neural network is the locating information for a mobile radio unit, The artificial neural network is an image of the actual radio network of the respective base station. The artificial neural network is given information regarding the limits of its own coverage area and the overlap with adjoining base stations.

In order to obtain the best possible decisions, the artificial neural network will have to learn a desired behaviour depending on the position and direction of movement of the mobile radio units.

As illustrated in FIG. 4 of the drawings, the artificial neural network is structured in a number of layers, i.e. an input layer, a number of intermediate layers and an output layer.

The input layer has a node, shown as a circle, for each selected measurement unit. As illustrated in FIG. 4, every one of the nodes in the input layer transfers its information to all nodes, shown as circles, in the first intermediate layer. Respective nodes in the first intermediate layer transfer their information to the nodes of the next intermediate layer and so forth. Only the first and last intermediate layers are illustrated in FIG. 4. The number of intermediate layers in the neural network is selected freely which is why one or a number of intermediate layers can be utilised. Finally, every one of the nodes in the last intermediate layer transfers its information to all nodes in the output layer which represents possible candidates for handover. This includes the base station to which the mobile radio unit is currently connected. The structure of the artificial neural network varies with measurement data which is why different radio environments result in different optimum structures.

Each node of the neural network is a neuron which weights input data from all neurons in the previous layer. FIG. 5 of the drawings illustrates the manner in which input data from each neuron is weighted and added together, and thereafter subjected to a transformation. The transformation is carried out in all layers of the neural network except the input layer which only contains one input per neuron. In order to obtain a desired behaviour, a nonlinear transfer function is selected.

In order to obtain correct decisions regarding handover, it is necessary for the neural network to be taught certain behaviour through the acquisition of information. This is effected by supplying training data to the system. The training data needs to be provided for the entire reception area to be handled by the base station, and the adjoining areas.

FIG. 6 of the drawings illustrates the measurement area for a base station. The solid lines show the desired reception area for a respective base station 1. The dotted lines represent measurement points for training data and the dashed areas illustrate the coverage area of the base station 1. The adjoining base stations 2 and 3 are also illustrated, as is the areas of overlap between the three base stations.

The construction of the artificial neural network is determined for each set of training data. Normalisation (see FIG. 3) is carried out for a value between 0 and 1 with the aid of a maximum value for each data item in the complete set of training data.

During the learning process, a mobile radio unit travels within the coverage area of the base station and the adjoining areas. In the mobile radio unit, measurements are made with respect to the relevant parameters referred to above. The mobile radio unit sends the results to the radio base station which further processes the information. During the training phase, different geographic positions are defined which can also be defined for other mobile radio units.

Also, during the learning process, weights, referred to above in relation to FIG. 5 of the drawings, are first randomly selected whereafter the network works with training data. For each set of training data, the result at the output nodes of the neural network is checked against a desired result. The difference between the desired result and the result obtained with the training data gives rise to an error. Calculation of weights is carried out, for example, by the optional gradient method and the error is spread back through the network. By changing the different weights, the result converges towards a desired result. When the error drops below a predetermined level, the neural network is considered to be trained and learning is terminated.

When the neural network is trained, the geographic position of a mobile radio unit can be unambiguously determined with the guidance of data obtained from the network. As stated above, the information regarding the position of a mobile radio unit is transferred to the locating block which transfers the information to the decision block. The decision block produces a vector with numbers which relate to the suitability for handover to a respective radio base station. The number varies within limits which depend on the selected transfer function. A decision is made with respect to history and hysteresis. "History" means that the decision block stores a number of the latest locating vectors. A demand is made that a certain number of these locating vectors should show the same result for handover to occur. A short history provides a fast decision, but a long history provides a more reliable decision at the cost of speed. Thus, an appropriate balance between these extreme cases must be carried out in the individual cases where different aspects get balanced against one another. "Hysteresis", referred to above, means that a candidate for handover would result in improved communication, by a certain measure, in relation to the suitability number of the existing base station. For handover to be possible, the hysteresis value must lie within the transfer function. Hysteresis relates the handover decision to the suitability number for the present base station and provides the same result in the handover function as the history.

We claim:

1. A method of establishing a mechanism to make handover decisions in a mobile communication system having a plurality of base units and a plurality of mobile units wherein each of said mobile units and said base units operate in geographic areas on set frequencies and wherein at least one given base unit operates on at least two frequencies comprising the steps of:

establishing in a neural network a plurality of input nodes, said number of input nodes being equal to or greater than the number of base units in said system;

layering said neural network with intermediate nodes, each of said intermediate nodes being interconnected with the other intermediate nodes and said input nodes and having a weighing coefficient;

outputting signals at a plurality of output nodes, said number of output nodes being equal or greater in number than the number of base units in said system;

creating a set of preliminary weighing coefficients to at least one layer of said intermediate nodes by traversing the actual area used by said base stations with a test vehicle containing a mobile unit and establishing weighing coefficients based upon actual communication with the base stations in said system;

comparing the outputs of said plurality of said output nodes against a known result and repeating said creating step until said output from said output nodes equals or exceeds said known result.

2. The method as in claim 1 wherein the establishing of input nodes is in an amount equal to the number of base stations times the number of frequencies each given base station has to operate.

3. The method as in claim 1 wherein the outputting occurs at a number of output nodes that is in an amount equal to the number of base stations times the number of frequencies each given base station has to operate.

4. A method as in claim 1 further comprising prior to said first execution of said creating step the step of:

randomizing an initial coefficients set in said intermediate node.

5. A method as in claim 1 further comprising the step of:

maintaining a historical database of handover decisions based upon actual operation of the system after an initial step of creating has been completed.

* * * * *

UNITED STATES PATENT AND TRADEMARK OFFICE
CERTIFICATE OF CORRECTION

PATENT NO. : 5,434,950
DATED      : July 18, 1995
INVENTOR(S): Robert KALLMAN

It is certified that error appears in the above-indentified patent and that said Letters Patent is hereby corrected as shown below:

On the title page, Items [19] and [75], the inventor's last name should read:

[19] --Källman--

[75] --Källman--

Signed and Sealed this

Twenty-ninth Day of August, 1995

Attest:

BRUCE LEHMAN

*Attesting Officer*     *Commissioner of Patents and Trademarks*